United States Patent [19]
Schena et al.

[11] Patent Number: 5,946,646
[45] Date of Patent: Aug. 31, 1999

[54] INTERACTIVE ADVERTISING SYSTEM AND DEVICE

[75] Inventors: Robert J. Schena, Haverford; Kelly L. Carr, Wallingford; David J. Schena, Warminster; Edward J. Glantz, Port Matilda, all of Pa.

[73] Assignee: Digital Broadband Applications Corp., Wayne, Pa.

[21] Appl. No.: 08/704,584

[22] PCT Filed: Mar. 29, 1995

[86] PCT No.: PCT/US95/03805

§ 371 Date: Dec. 19, 1996

§ 102(e) Date: Dec. 19, 1996

[87] PCT Pub. No.: WO96/30864

PCT Pub. Date: Oct. 3, 1996

[51] Int. Cl.⁶ .............. H04L 5/00; H04L 12/00; H04N 1/46
[52] U.S. Cl. .......... 702/177; 395/200.31; 705/1; 345/329; 455/6.3; 379/90.01; 370/270
[58] Field of Search .............. 395/200.3, 200.31, 395/200.47; 705/1, 16, 26, 35; 707/1, 200; 345/326, 327, 329; 455/5.1, 6.3; 379/90.01, 93.01, 93.06, 93.07; 370/270; 702/176, 177, 178

[56] References Cited

U.S. PATENT DOCUMENTS

| | | | |
|---|---|---|---|
| 5,027,400 | 6/1991 | Baji et al. | 380/20 |
| 5,093,718 | 3/1992 | Hoarty et al. | 358/84 |
| 5,105,184 | 4/1992 | Pirani et al. | 340/721 |
| 5,220,420 | 6/1993 | Hoarty et al. | 358/86 |
| 5,305,195 | 4/1994 | Murphy | 364/401 |
| 5,325,423 | 6/1994 | Lewis | 379/90 |
| 5,327,554 | 7/1994 | Palazzi, III et al. | 395/600 |
| 5,347,632 | 9/1994 | Filepp et al. | 395/200 |
| 5,448,625 | 9/1995 | Lederman | 379/67 |
| 5,457,305 | 10/1995 | Akel et al. | 235/379 |
| 5,532,923 | 7/1996 | Sone | 364/138 |
| 5,555,407 | 9/1996 | Cloutier et al. | 395/600 |
| 5,572,643 | 11/1996 | Judson | 395/793 |
| 5,600,366 | 2/1997 | Schulman | 348/9 |
| 5,604,542 | 2/1997 | Dedrick | 348/552 |
| 5,654,886 | 8/1997 | Zereski, Jr. et al. | 364/420 |
| 5,748,190 | 5/1998 | Kjorsvik | 345/329 |
| 5,796,945 | 8/1998 | Tarabella | 395/200.9 |
| 5,819,284 | 10/1998 | Farber et al. | 707/104 |

*Primary Examiner*—Patrick Assouad
*Attorney, Agent, or Firm*—Seidel, Gonda, Lavorgna & Monaco, P.C.

[57] ABSTRACT

A device for generating and displaying a message is disclosed. The present invention comprises a computer memory for storing the ad, message and searchable database in a memory, a distribution link for transmitting the ad, message and searchable database to a remote location for storing said message, and means associated with an end user workstation at the remote location for retrieving said ad, message and searchable database and displaying same on a CRT monitor associated with the workstation at a time when the workstation is not in use.

39 Claims, 8 Drawing Sheets

1. Workstation Activity Monitor
   - Monitors local workstation for keyboard activity
   - when keyboard is inactive for a specified period of time, the CBC screen show is activated.

2. Screen Show
   - The screen show will display advertisement or images in a sequence
   - the sequence will be managed for each workstation from a CBC administrative workstation.

3. CBC Desktop Menu
   - The CBC menu is the common platform for information providers and advertisers.

4. Information Provider Application
   - This is an example of the "Yellow Pages" as an information provider.

ACTION INDEX

- DENTISTS
- PRINTERS
- TRAVEL
- COMPUTERS
- PHOTOGRAPHY
- TEMPORARY SERVICES
- COMMUNICATIONS
- OPTOMETRISTS
- TELEVISION REPAIR
- CHEMICALS
- LIBRARIES
- SEAMSTRESS
- AUDIO EQUIPMENT
- FURNITURE
- SCHOOLS
- ACCOUNTS
- FOOD
- RESUMES

SEARCH

RETURN

INTERACTIVE ADVERTISING SYSTEM AND DEVICE

FIELD OF THE INVENTION

The present invention is directed to a messaging and imaging system designed to be placed on a Local Area Network (LAN) and which appears on a local CRT monitor. In particular, the present invention is directed to a system which can be utilized to display images or messages on a CRT screen as well as provide a searchable database for interactive activities such as catalog shopping.

BACKGROUND OF THE INVENTION

Recently, a two-way, high speed, high volume, information "superhighway" has begun to evolve which has the potential to reach every American home and business. It is anticipated that this electronic information superhighway could generate as much as 321 billion dollars in new net GNP growth over the next sixteen years within the United States.

The substantial deployment of fiber optics by telephone and CATV companies has created an infrastructure capable of transmitting billions of bits of data per second through these networks. Advancements in digital video compression technologies further make it practical to digitize and send high-quality full motion video in addition to audio, text and graphics over these networks.

The confluence of digital signal processing, microelectronics and electro-optic technologies will permit the deployment of interactive switched digital broadband networks and the distribution of two-way, real time, interactive programming and services. As the cost of data storage and processing is reduced, these networks will become increasingly cost effective, providing unlimited opportunities for businesses to develop new products and services and to deliver their current offerings more efficiently.

One of the biggest opportunities which exists for data and information transmission over this superhighway is the potential for the transmission of data, messages and information to computer terminals and monitors during their inactive periods. Such transmissions could include advertisements, printable coupons and interactive database search features. Such a system could further perform the function of a screen saver.

Screen savers have been in existence since the mid-1980's. Screen savers were developed to prevent a phosphor image from being burned onto a CRT screen during prolonged periods of non-usage. Typically, a screen saver comprises a prestored multi-media presentation which comes onto the screen after a prescribed period of non-usage by the user. Screen savers reside in the system software and use approximately 100 kilobytes of RAM. Screen savers often provide an eye-pleasing color pattern of random geometric shapes.

U.S. Pat. No. 5,105,184 entitled Methods For Displaying An Integrating Commercial Advertisements For Computer Software discloses a system directed to adding commercial advertisements for different screen types. In this patent, the advertisements are hard coded into the software. The hard coded advertisements further do not function as screen savers and the system is not interactive. Further, in this embodiment, the software developer gets the revenue for placing the advertisement rather than the network owner.

It would be desirable to provide a message transmission system which could be both an interactive and searchable database and function as a screen saver. The present invention is directed to a device for providing on-line interactive advertising or messaging which can perform the function of a screen saver. In accordance with the present invention, a series of logos, messages, or advertisements are, for example, transmitted to the computer display when a computer is left inactive for a set period of time. In this respect, the present invention functions as a screen saver and prevents screen damage. The present invention is thus directed to a system and technology for placing messages such as advertisements on a local terminal during periods when the terminal is not in use. These and other objects of the present invention will become apparent from the summary and detailed description which follow.

SUMMARY OF THE INVENTION

In accordance with the present invention a device for displaying an interactive message is disclosed. The device comprises: means for storing said message in a memory means associated with a central station; means for distributing said message from said central station to a local workstation; and means associated with a local workstation for displaying said image during an inactive period of said workstation.

In a more preferred embodiment, the present invention is directed to a device for generating and displaying an interactive message comprising; means for generating said interactive message at a central station; means for storing said message in a central memory at said central station; means for distributing said message from said central memory to a remote location; means for storing said message at said remote location; and display means associated with an end user workstation for retrieving said message and displaying said message during an inactive period of said workstation.

In yet a further embodiment, the present invention comprises means for generating a message; means for storing said image in a computer memory; distribution means for distributing said stored message to a local end user workstation; means for storing said distributed message on a file server associated with a local user workstation; means for displaying said message on a CRT screen associated with said end user workstation during an inactive period of said workstation.

DETAILED DESCRIPTION OF THE PRESENT INVENTION

The present invention is described with reference to the enclosed Figures wherein the same numbers are used where applicable. In a broadest embodiment, the present invention is directed to a device and system for storing and transmitting messages and images to a local workstations so that the messages and images are displayed on the local workstation. The messages so displayed may be transmitted by a distribution means such as a modem or FDDI link to a single local workstation or, alternatively, by a computer network to a plurality of local workstations.

The messages, which may comprise advertisements, are displayed over the local workstations during periods when the local terminal or CRT is not being utilized. In this way, the messaging system of the present invention performs the function of a screen saver thus preventing the burning of a phosphor image into the computer screen and the damage to the monitor.

Figure 1:
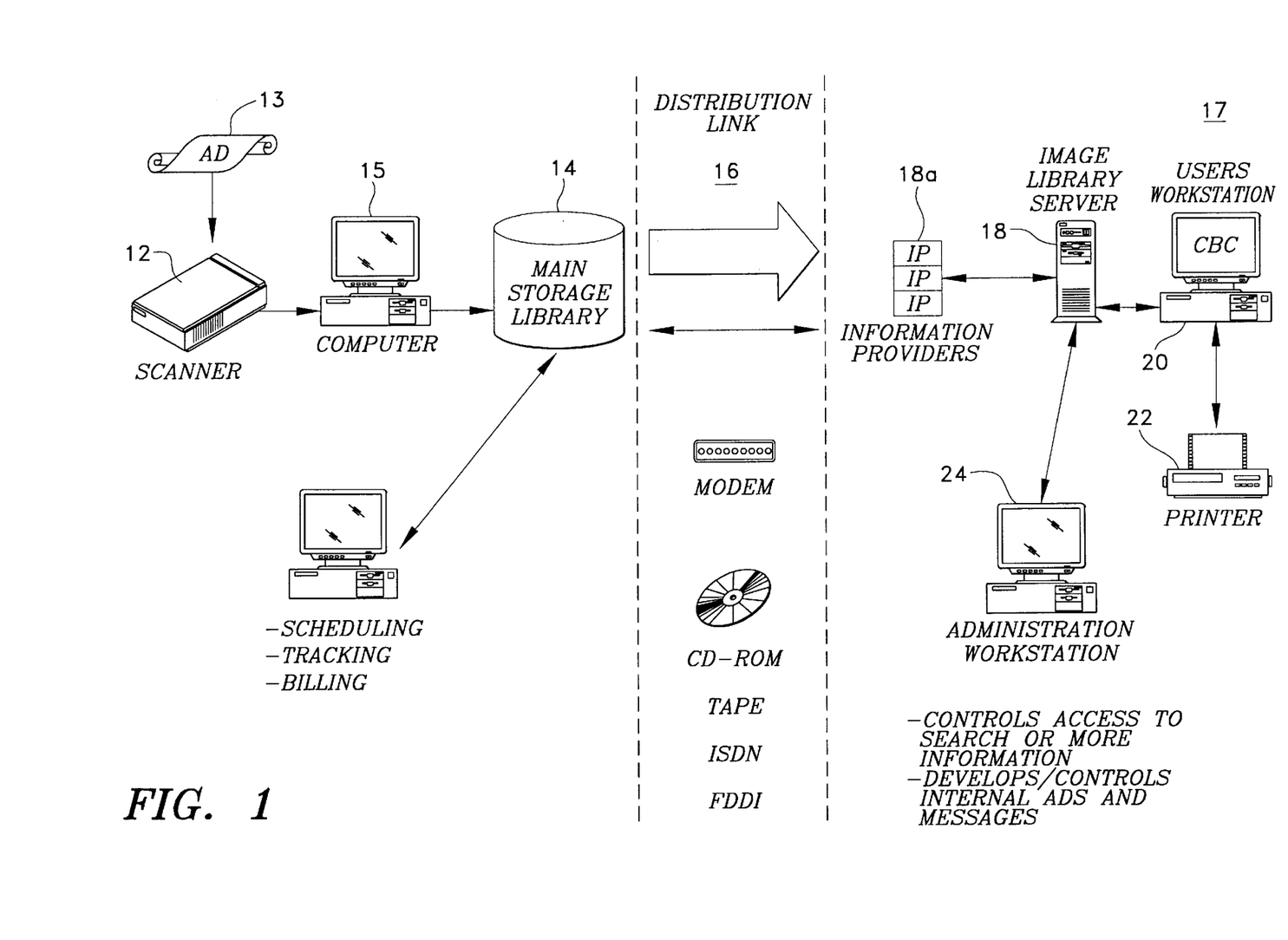
FIG. 1 is a block diagram of a message transmission and display system in accordance with the present invention.

Referring to FIG. 1, a block diagram of the message distribution and system of the present invention is shown. In broad terms, the present invention comprises means 12 for placing an advertisement or message 13 into a central or main computer library 14 via a compiler 15. In a preferred embodiment, means 12 comprises an ORC scanner or similar device. The distribution system of the present invention further includes means 16 which links the main computer library 14 and a local customer 17 and end user workstation 20.

As shown in FIG. 1, the network customer 17 will have on the local site, for example, an image library server 18, an end user workstation 20 and a printer 22. The printer 22 may be utilized for selectively printing out the image, message or coupon. In a preferred embodiment, the local system and workstation 20 will be under the control of an administration workstation 24 which will control access to more information and develops or controls internal advertisements and messages for distribution to workstation 20.

The distribution means 16 of the present invention may comprise a number of data transmission systems including a modem, CD-ROM diskette, ATM (Asynchronous Transfer Mode), ISDN or FDDI communication link. Initially, an advertisement or message to be displayed at the local user workstation 20 is scanned by optical scanner 12 into a computer compiler 15 at the central station 11. The message is then stored in main storage library 14 at the central station 11.

The stored images or messages may comprise, for example, still and/or multi-media advertising messages or images such as an advertisement for a newspaper such as the Asbury Park Press or products such as COCA-COLA® or PEPSI-COLA®. The images or messages are then distributed from the central location by distribution means 16. In a preferred embodiment, the distribution means of the present invention comprise, for example, a modem, CD-ROM diskette, ISDN or FDDI communication link or ATM (Asynchronous Transfer Mode). The images, messages and searchable database will be stored by the local image library 18.

When the user's workstation 20 is not in use for a predetermined period of time, the message, which may be an advertisement, will automatically be transmitted onto the screen of the local workstation 20. The message will be served by an image library server 18 in association with the administration workstation 24. The administration workstation controls the flow of the images or messages, controls internal ads and messages which may be locally input onto the system, and controls access to the searchable database.

In a preferred embodiment, the advertisements will be relatively brief in content and may have some type of animation such as a cartoon character in overalls "putting up" the billboard. Advertisers will be able to choose the companies to which they advertise. Conversely, companies will be able to block advertisements (for example, a competitor's advertisements if they so desire). The advertisers will also be given the ability to target different employee levels within each company. These levels could include upper management, staff, sales personnel, clerical/administrative, etc. This feature would rely on the extent of the companies' computer network and willingness to allow such selective advertising.

Furthermore, companies will be given the ability to advertise their own products and services internally as well as create and display messages announcing the latest corporate news such as birthdays, promotions, etc. The software will track how often and how long each external advertisement is played at each client site and the advertiser will be billed accordingly. A certain percentage of the collected fees will be passed through to each client, based on usage, thus creating a revenue stream.

Figure 2:
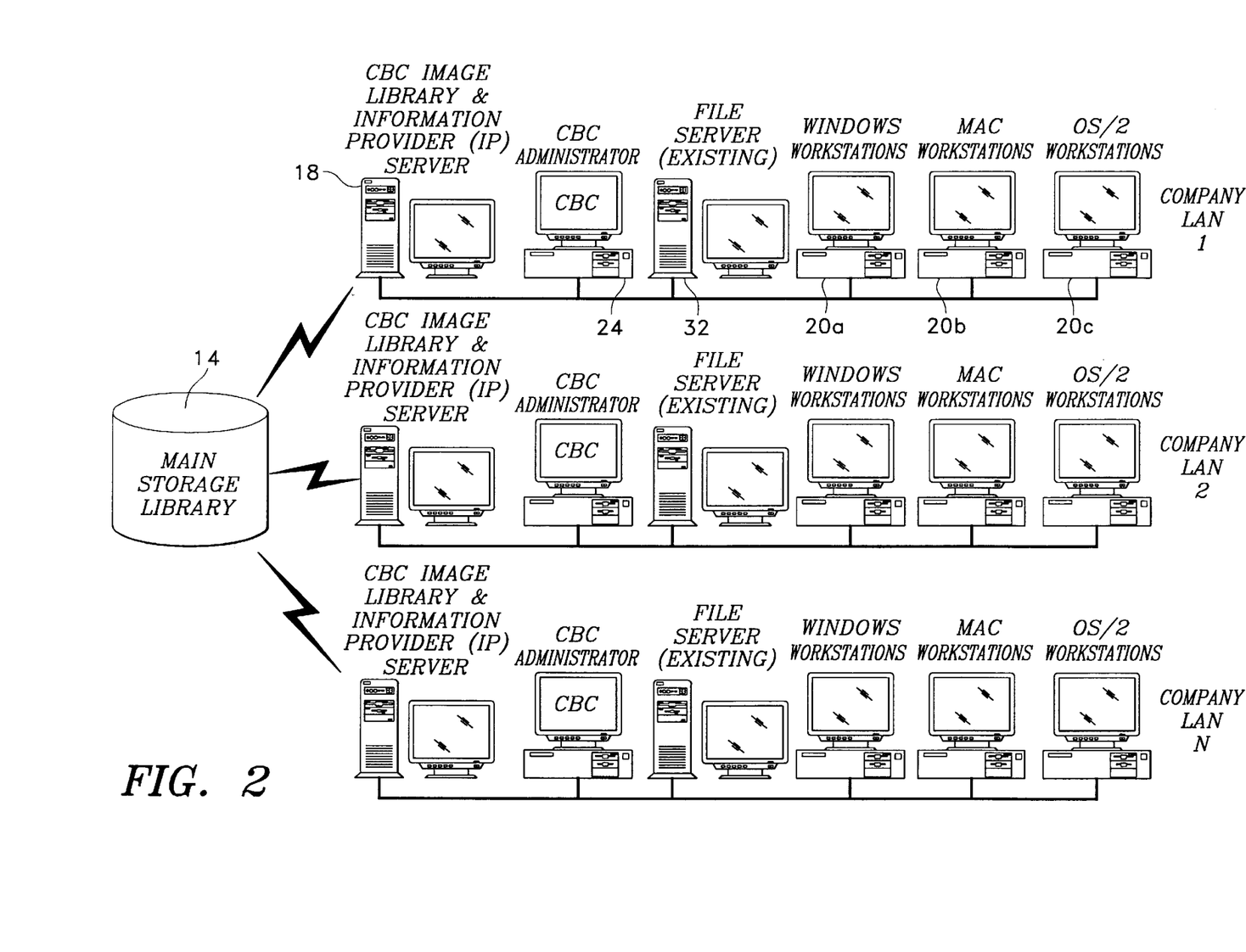
FIG. 2 is a network diagram of the message transmission and display system of the present invention.

Referring to FIG. 2, a network system in accordance with the present invention is disclosed. In this system, a main storage library 14 serves a plurality of companies or organizations. The main storage library 14 is in communication with a series of companies or organizations within the network. Each company in the network will be served by a local library server 18 with stored images, messages such as advertisements and a searchable database. Each company within the system will typically have an administration workstation 24 and general file server 32. The administration workstation 24 permits the addition of site specific messages as well as controlling access to the searchable database.

The image library 18 stores and distributes a plurality of images or messages to the individual workstations within the company and will typically contain data for a plurality of information providers. The workstations may function in a number of environments including WINDOWS, MACINTOSH, and OS-2 (20a–c). From the central library 14, messages may be transmitted or distributed to a plurality of company locations.

Figure 3:
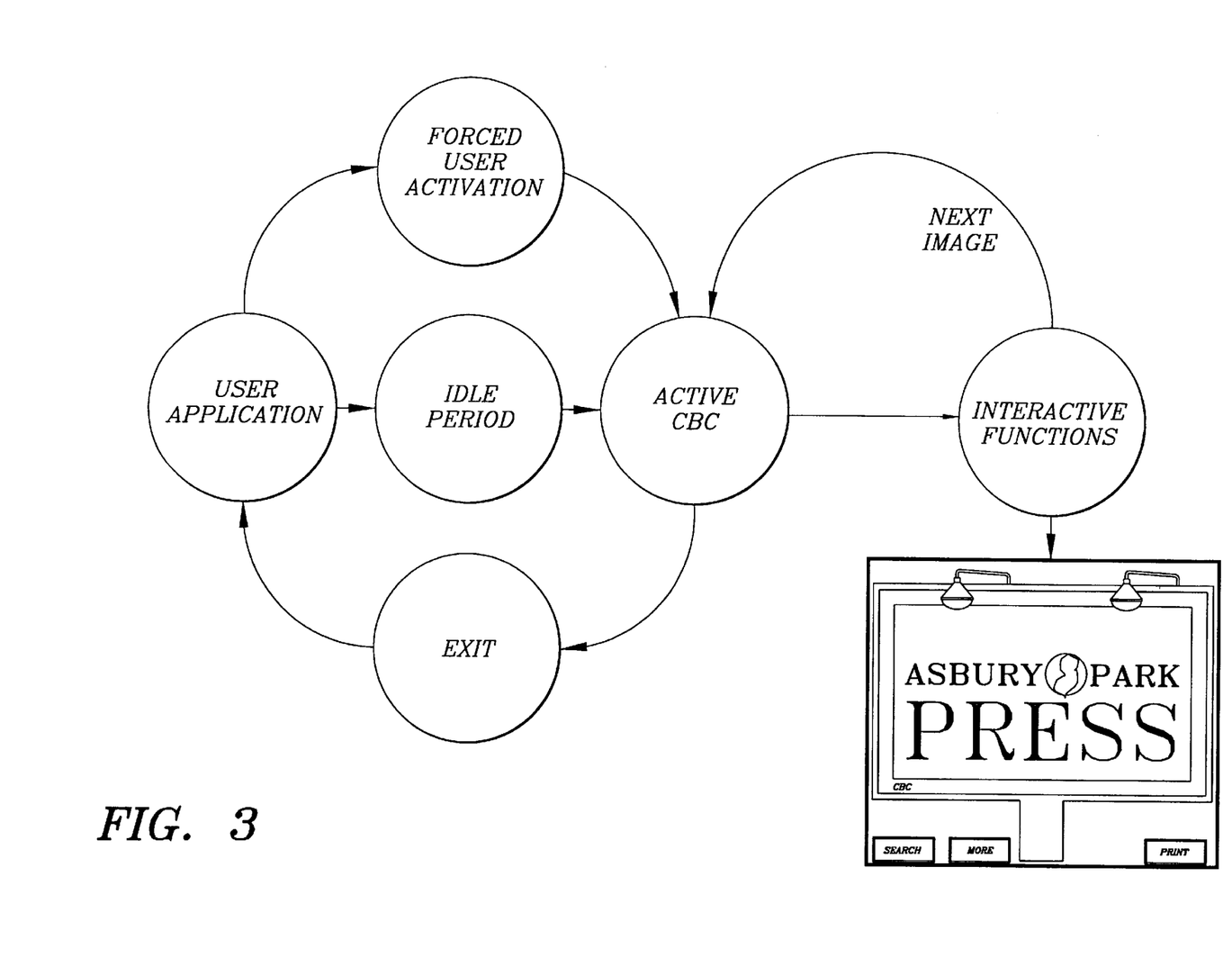
FIG. 3 is a state diagram of the message transmission and display system of the present invention.

FIG. 3 represents a state diagram of a messaging system in accordance with the present invention. In operation, the end user workstation 20 will typically be operating under an application program such as WordPerfect® or LOTUS® or other application programs. If the computer workstation remains idle for a predetermined period of time, the messaging system of the present invention will become activated. Under the present system, messages prestored in the file server will be transmitted to the workstation 20 and shown on the monitor at regular intervals. When the user resumes working at the workstation 20, the message is eliminated and the application program such as WordPerfect® or LOTUS® is reactivated. The present invention also incorporates a search feature whereby new images may be selectively activated by the user at workstation 20.

Figure 6:
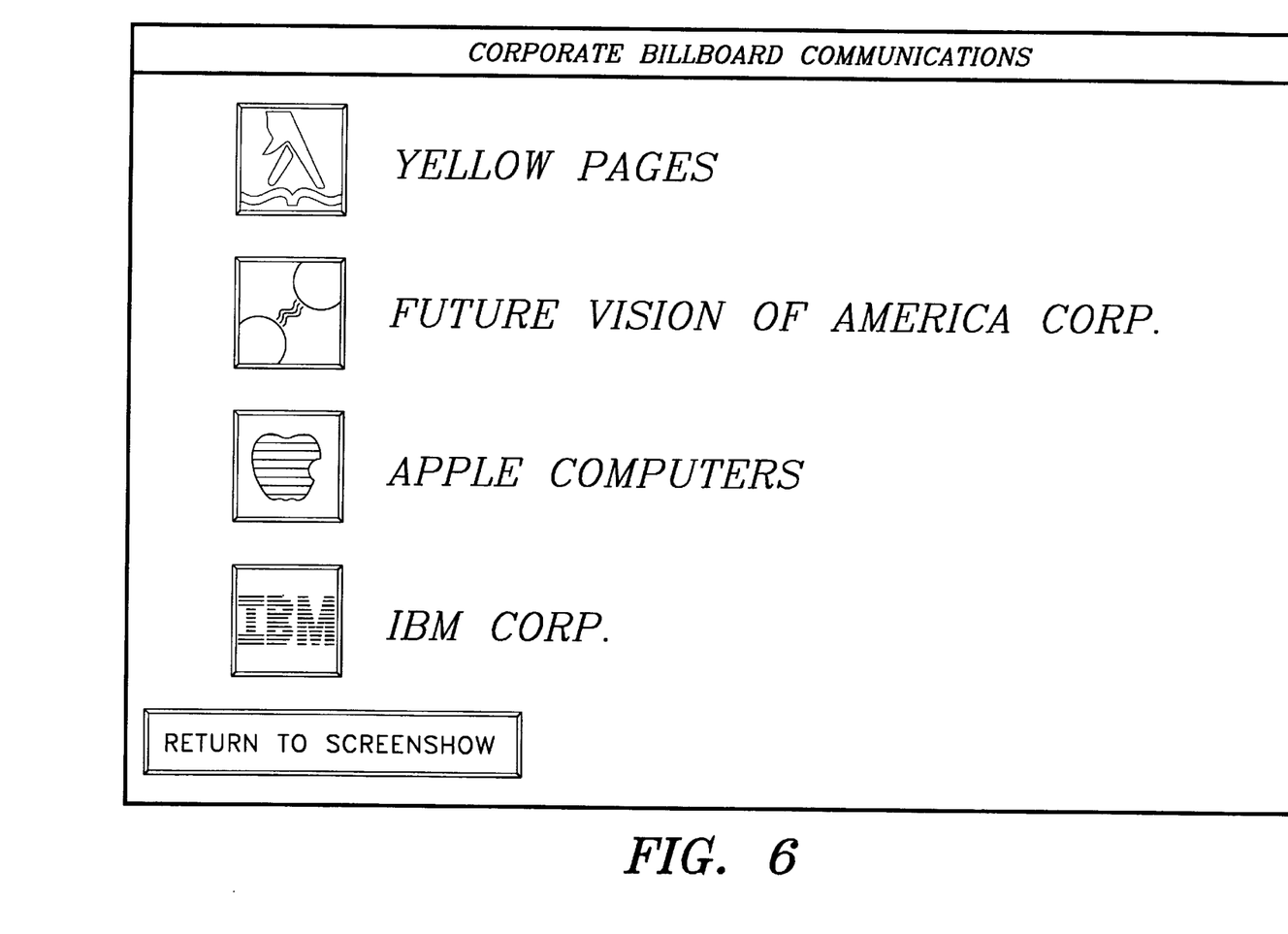
FIGS. 6 through 8 illustrate window graphical user interfaces for use in accordance with the present invention.
Figure 7:
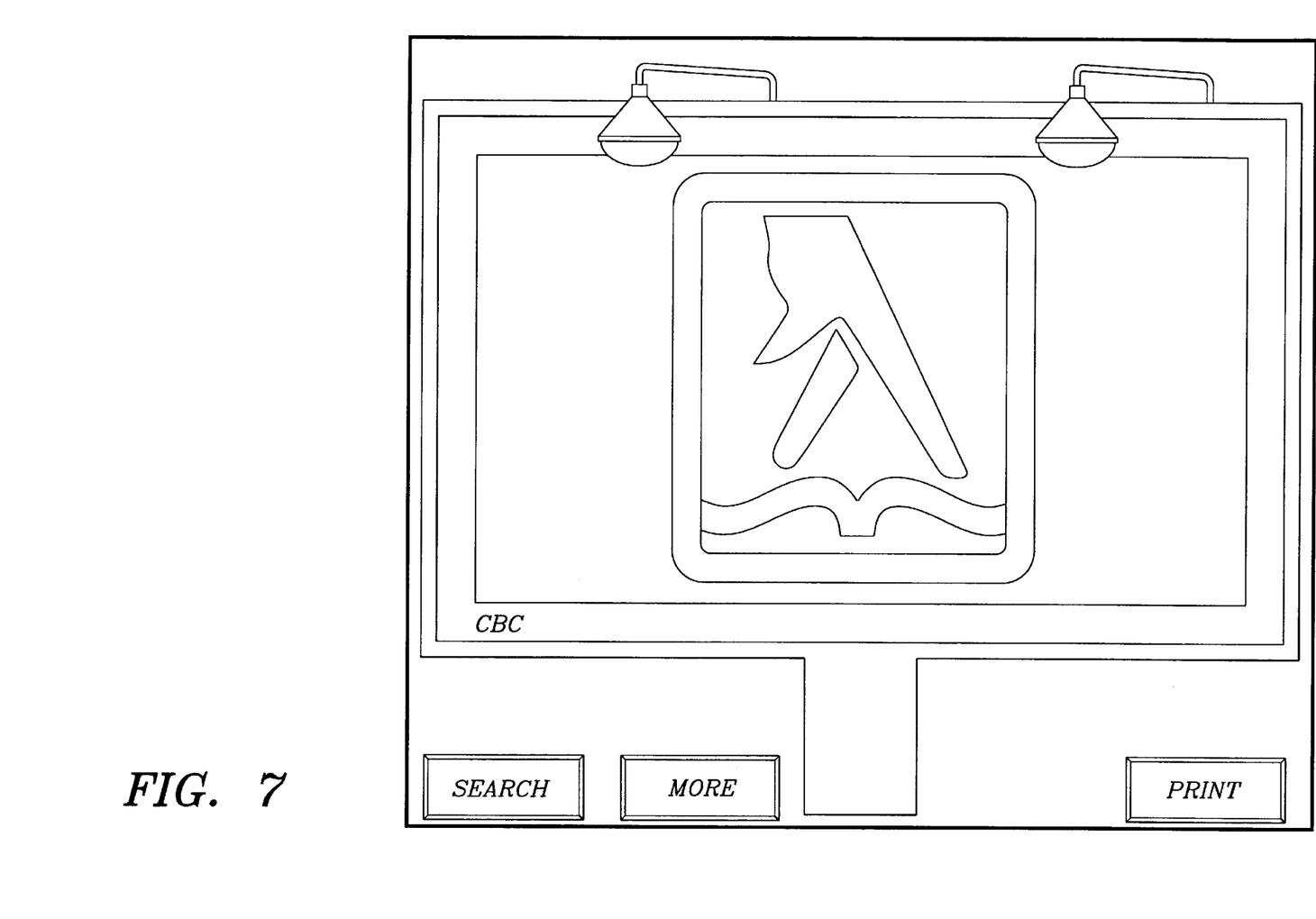
Figure 8:
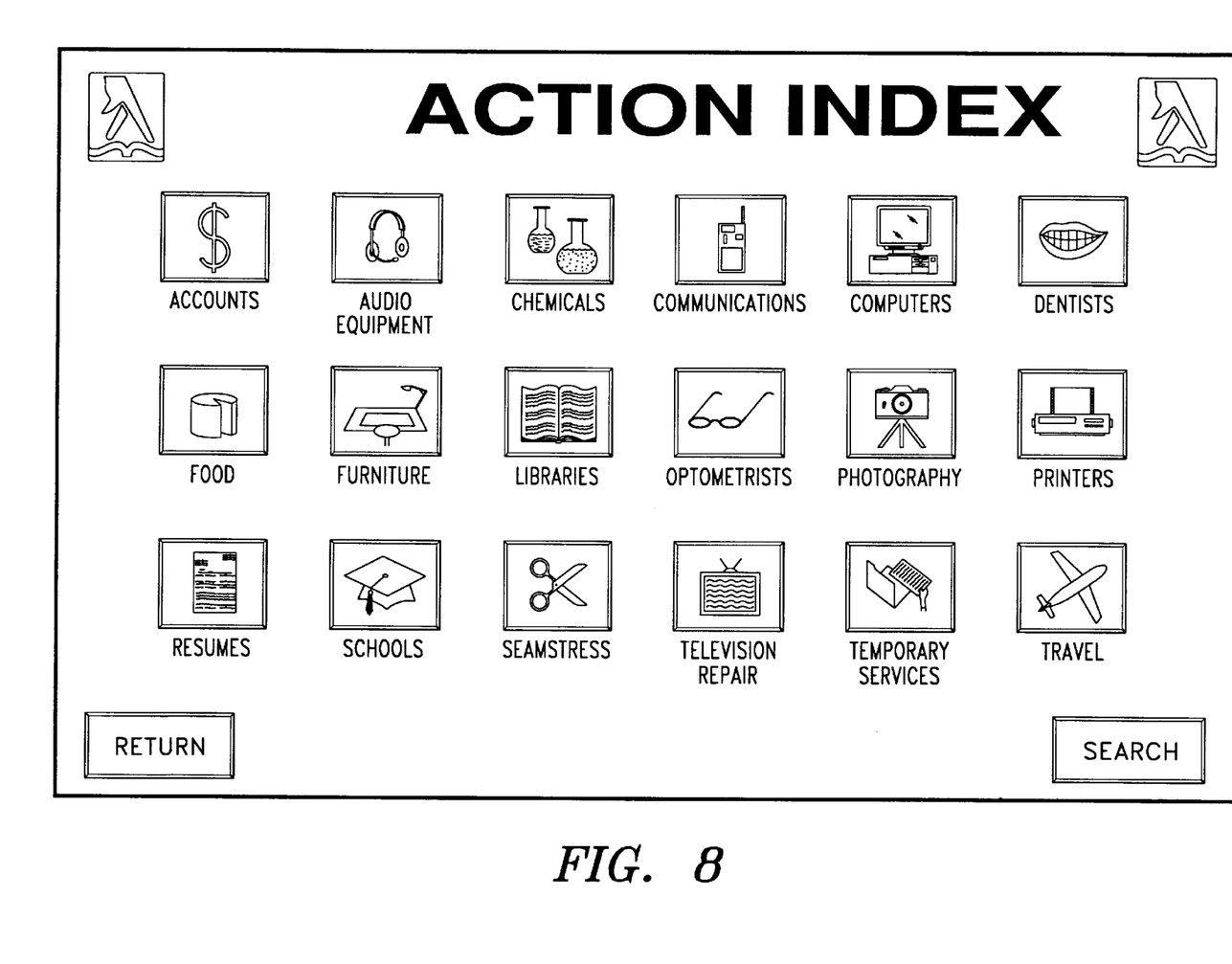

In addition, there will be some limited interactivity available to the end user under the present invention. FIGS. 6 through 8 illustrate potential WINDOWS outputs including SEARCH 34, MORE 36 and PRINT 38 features.

As stated above, the messages will be brief in content. Many advertisers will be interested in conveying additional information. To that extent, when additional information is available, the MORE button 36 will be active at the bottom of the advertisement. The employee by clicking an input device such as a mouse can pull up another screen that will give additional details from the advertiser. For example, clicking MORE 36 on a car advertisement presented on the system could provide the user with locations of nearby dealerships. A restaurant advertisement could bring up a coupon that could be printed by clicking on the PRINT 38 button at the bottom, right hand corner of the screen. This coupon could then be used as if it had been cut out of a newspaper. A click on a "CONTINUE" button would then take the employee back to the screenshow if so desired, or, by pressing the "SPACEBAR" on the keyboard, the employee would be taken back to work.

If the keyboard is left inactive for the earlier mentioned, predetermined time the screenshow would automatically start back up as a screen saver. A further feature is the addition of a SEARCH 34 button which is displayed at the bottom, left hand corner of the screen. This button will allow the user to search for a particular ad that they might have seen on a prior day or heard of from someone else.

The SEARCH 34 button could be used for more than just searching for advertisements (external advertisements). It can be used to search through internal messages/advertisements as well as for catalog shopping. The catalog shopping could be divided into two categories: business related and personal. The software will permit companies to determine when their employees can access the database feature. The company may also choose no access or unlimited access.

Figure 4:
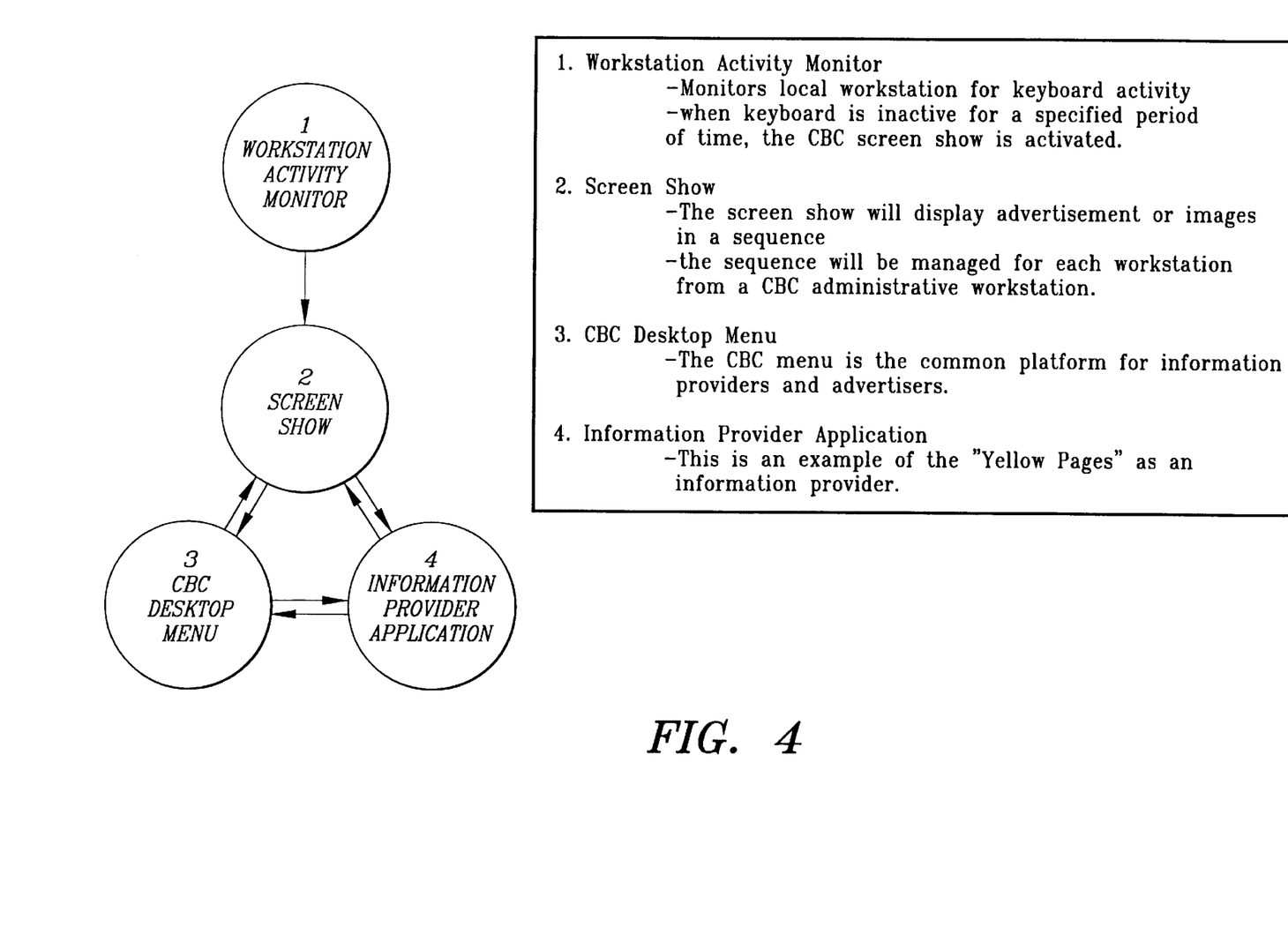
FIG. 4 is an event diagram in accordance with the present invention.

Referring to FIG. 4, an event diagram in accordance with the present invention is shown and described. As shown, there are four event subparts within the system: (1) a workstation activity monitor; (2) a screenshow; (3) a desk top menu; and (4) an information provider application.

The workstation activity monitor monitors the local workstation for keyboard activity. When the keyboard is inactive for a specified period of time, the screenshow is activated. The screenshow will display advertisements or images in a sequence. The sequence will be managed for each workstation from an administrative workstation. The desk top menu is a common platform for information providers and advertisers. The information provider application is, for example, a Yellow Pages application.

Figure 5:
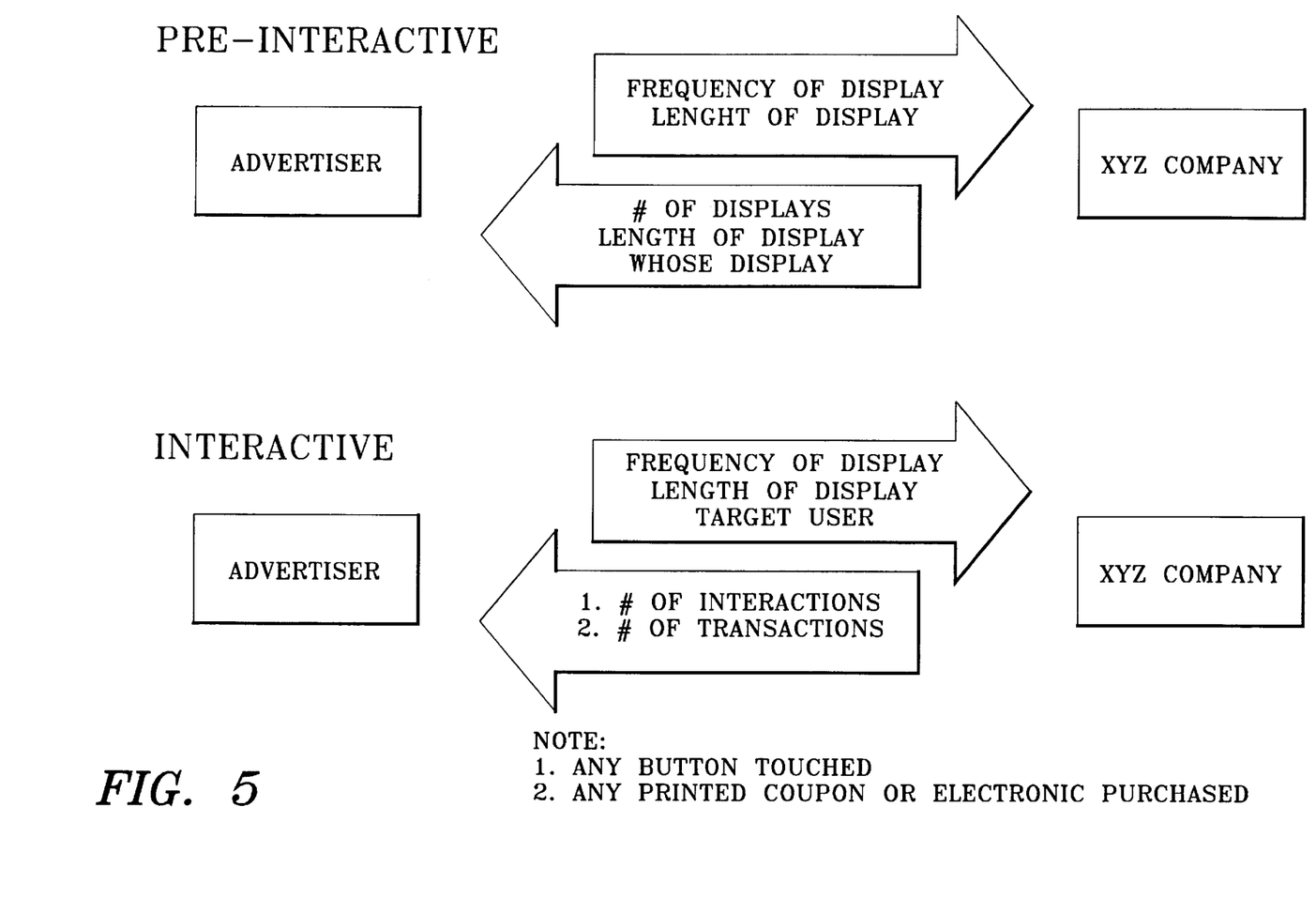
FIG. 5 is a flow diagram which illustrates the flow of advertiser information flow diagram in accordance with the present invention.

Referring to FIG. 5, a communications information flowchart is shown. In this example, an advertiser is assumed to provide images to the XYZ Company. In the pre-interactive mode, the advertiser controls the frequency of the display and the length of display. The company (XYZ) controls the number of displays, the length of each display and whose displays will be shown.

In an interactive format, the advertiser controls the frequency of display, the length of display and the target user. The company can control the number of transactions and the number of interactions.

FIG. 6 comprises a menu for a group of applications including Yellow Pages, Apple Computers, Future Vision of American (Assignee of the present invention), and IBM Corp. is displayed. Each application includes catalog information. By accessing the Yellow Pages application, for example, as shown in FIGS. 7 and 8, the user is shown a new window with a plurality of potential action "yellow page" items such as accountants, chemicals and television repair which can be selected.

The present invention has been described with reference to the enclosed Figures. It is to be appreciated that other embodiments fulfill the spirit and scope of the present invention and that the true nature and scope of the present invention is to be determined with reference to the claims appended hereto.

What is claimed is:

1. A system for distributing interactive multimedia information comprising a user workstation connected to a network, the user workstation containing
  a display device and a storage device receiving a sequence of multimedia information from the network;
  an activity monitor for detecting a predetermined idleness criterion wherein the predetermined idleness criteria is met when the user workstation fails to receive user input; and
  a screen-show for displaying the sequence on the display device, the screen-show being in communication with the activity monitor whereby the screen show is activated when the preselected idleness criterion is met; and
an administration workstation in communication with the user workstation via the network, the administration workstation being capable of
  controlling the sequence;
  tracking the duration and frequency of the displayed multimedia information in the sequence at the user workstation, wherein the sequence is in part provided by an information provider via the network;
  billing the information provider a fee for displaying the provided multimedia information as part of the sequence, and
  tracking a percentage of the fee which will be paid back to an owner of the user workstation.

2. A system for distributing interactive multimedia information comprising a user workstation connected to a network, the user workstation containing
a display device and a storage device receiving a sequence of multimedia information from tie network;
an activity monitor for detecting a preselected idleness criterion wherein the preselected idleness criterion is met when the user workstation fails to receive user input for a preselected period of time; and
a screen-show for displaying the sequence on the display device, the screen show being in communication with the activity monitor whereby the screen-show is activated when the preselected idleness criterion is met.

3. A system of claim 1, wherein the screen-show displays the sequence in a screen saver.

4. A system of claim 2, further comprising an administration workstation in communication with the user workstation via the network, capable of controlling the sequence.

5. A system of claim 4, wherein the administration workstation is further capable of tracking the duration and frequency of the displayed multimedia information in the sequence at the user workstation.

6. A system of claim 4, wherein the sequence is in part provided by an information provider via the network, the administration workstation further capable of billing the information provider a fee for displaying the provided multimedia information as part of the sequence.

7. A system of claim 6, wherein the administration workstation is further capable of tracking a percentage of the fee which will be paid back to an owner of the user workstation.

8. A system of claim 3, wherein the sequence contains advertising information.

9. A system of claim 6, wherein the sequence contains advertising information associated with catalog information provided by the information provider.

10. A system of claim 1, wherein the administration workstation is further capable of being controlled by an owner of the user workstation for content of the multimedia information in the sequence.

11. A system of claim 10, wherein the administrative workstation is further capable of receiving internal multimedia information to be incorporated into the sequence from the owner.

12. A system of claim 10, wherein the administration workstation is capable of allowing the owner to block owner-selected multimedia information within the sequence.

13. A system of claim 1, wherein the administration workstation is further capable of allowing the information provider to target different user workstation levels of the owner.

14. A system of claim 1, wherein the administration workstation is further capable of accessing an application provided by the information provider to maintain a transaction with the information provider.

15. A system of claim 14, wherein the transaction is either of catalog shopping or a purchase.

16. A system of claim 1, wherein the predetermined idleness criteria is set to zero.

17. A system of claim 1, wherein the user workstation includes a search feature for selectively accessing the multimedia information by a user at any time.

18. A system of claim 1, wherein the administrative workstation is capable of allowing the information provider to control the frequency and length of multimedia information provided by the information provider in the sequence.

19. A system of claim 18, wherein the control includes targeting a user workstation.

20. A system of claim 18, wherein the administration workstation is capable of allowing the owner to control a number and length of multimedia information provided by the information provider in the sequence.

21. A system of claim 17, wherein the system is activated via the search feature when the user selects new multimedia information.

22. A system of claim 1, wherein the administration workstation is capable of allowing the owner to control when and how the user workstation is accessible.

23. A system of claim 2, wherein the screen-show displays the sequence in a screen saver.

24. A system of claim 4, wherein the administration workstation is further capable of being controlled by an owner of the user workstation for content of the multimedia information in the sequence.

25. A system of claim 2, wherein the screen-show displays the sequence in a screen saver.

26. A system of claim 4, wherein the administration workstation is further capable of being controlled by an owner of the user workstation for content of the multimedia information in the sequence.

27. A system of claim 4, wherein the administration workstation is further capable of allowing the information provider to target different user workstation levels of the owner.

28. A system of claim 4, wherein the administration workstation is further capable of accessing an application provided by the information provider to maintain a transaction with the information provider.

29. A system of claim 4, wherein the predetermined idleness criteria is set to zero.

30. A system of claim 2, wherein the user workstation includes a search feature for selectively accessing the multimedia information by a user at any time.

31. A system of claim 2, wherein the administrative workstation is capable of allowing the information provider to control the frequency and length of multimedia information provided by the information provider in the sequence.

32. A system of claim 4, wherein the administration workstation is capable of allowing the owner to control when and how the user workstation is accessible.

33. A system of claim 2, further comprising an interactivity feature for selectively accessing the multimedia information by a user at any time via an interactivity button displayed in the screen-show.

34. A system of claim 33, wherein the interactivity feature is capable of accessing an application as part of the sequence provided by an information provider to maintain a transaction between a user and the information provider.

35. A system of claim 34, further comprising an administration workstation in communication with the user workstation via the network, capable of controlling the transaction.

36. A system of claim 35, wherein the administration workstation is further capable of controlling a number of transactions between the user and the information provider and a number of interactions between the user and the information provider.

37. A system of claim 36, wherein the administration workstation is further capable of billing the information provider a fee for maintaining either of the controlled number of transactions or the controlled number the interactions.

38. A system of claim 37, wherein the administration workstation is further capable of tracking a percentage of the fee which will be paid back to an owner of the user workstation.

39. A system of claim 38, wherein the transaction is either of catalog shopping or a purchase.

* * * * *